US007493293B2

(12) United States Patent
Kanungo et al.

(10) Patent No.: US 7,493,293 B2
(45) Date of Patent: Feb. 17, 2009

(54) SYSTEM AND METHOD FOR EXTRACTING ENTITIES OF INTEREST FROM TEXT USING N-GRAM MODELS

(75) Inventors: Tapas Kanungo, San Jose, CA (US); James J. Rhodes, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 11/421,379

(22) Filed: May 31, 2006

(65) Prior Publication Data

US 2008/0040298 A1    Feb. 14, 2008

(51) Int. Cl.
*G06F 15/18*    (2006.01)

(52) U.S. Cl. .......................................................... 706/12

(58) Field of Classification Search ........................ None
See application file for complete search history.

(56) References Cited

U.S. PATENT DOCUMENTS

| 5,418,951 | A | 5/1995 | Damashek | |
|---|---|---|---|---|
| 5,752,051 | A | 5/1998 | Cohen | |
| 5,845,049 | A | 12/1998 | Wu | |
| 5,949,961 | A * | 9/1999 | Sharman | 704/260 |
| 5,970,453 | A * | 10/1999 | Sharman | 704/260 |
| 5,983,180 | A * | 11/1999 | Robinson | 704/254 |
| 6,047,251 | A * | 4/2000 | Pon et al. | 704/1 |
| 6,098,035 | A * | 8/2000 | Yamamoto et al. | 704/9 |
| 6,167,398 | A | 12/2000 | Wyard et al. | |
| 6,169,969 | B1 | 1/2001 | Cohen | |
| 6,178,396 | B1 * | 1/2001 | Ushioda | 704/1 |
| 6,311,152 | B1 * | 10/2001 | Bai et al. | 704/9 |
| 6,314,399 | B1 * | 11/2001 | Deligne et al. | 704/257 |
| 6,415,248 | B1 * | 7/2002 | Bangalore et al. | 704/1 |
| 6,574,597 | B1 * | 6/2003 | Mohri et al. | 704/251 |
| 6,636,636 | B1 | 10/2003 | Takasu | |
| 6,785,651 | B1 * | 8/2004 | Wang | 704/246 |
| 6,865,528 | B1 * | 3/2005 | Huang et al. | 704/9 |
| 7,013,264 | B2 * | 3/2006 | Dolan et al. | 704/9 |
| 7,013,265 | B2 * | 3/2006 | Huang et al. | 704/9 |
| 7,016,830 | B2 * | 3/2006 | Huang et al. | 704/9 |
| 7,031,908 | B1 * | 4/2006 | Huang et al. | 704/9 |
| 7,046,847 | B2 * | 5/2006 | Hurst et al. | 382/176 |

(Continued)

OTHER PUBLICATIONS

Investigating linguistic knowledge in a maximum entropy token-based language model Jia Cui; Yi Su; Hall, K.; Jelinek, F.; Automatic Speech Recognition & Understanding, 2007. ASRU. IEEE Workshop on Dec. 9-13, 2007 pp. 171-176 Digital Object Identifier 10.1109/ASRU.2007.4430104.*

(Continued)

*Primary Examiner*—Michael B Holmes
(74) *Attorney, Agent, or Firm*—Daniel E. Johnson

(57) ABSTRACT

A document (or multiple documents) is analyzed to identify entities of interest within that document. This is accomplished by constructing n-gram or bi-gram models that correspond to different kinds of text entities, such as chemistry-related words and generic English words. The models can be constructed from training text selected to reflect a particular kind of text entity. The document is tokenized, and the tokens are run against the models to determine, for each token, which kind of text entity is most likely to be associated with that token. The entities of interest in the document can then be annotated accordingly.

27 Claims, 9 Drawing Sheets

U.S. PATENT DOCUMENTS

| | | | |
|---|---|---|---|
| 7,050,964 B2* | 5/2006 | Menzes et al. ................. 704/2 |
| 7,113,903 B1* | 9/2006 | Riccardi et al. ................ 704/4 |
| 7,129,932 B1* | 10/2006 | Klarlund et al. ............ 345/168 |
| 7,143,091 B2* | 11/2006 | Charnock et al. .............. 707/5 |
| 7,171,350 B2* | 1/2007 | Lin et al. ....................... 704/9 |
| 7,200,559 B2* | 4/2007 | Wang ......................... 704/257 |
| 7,206,735 B2* | 4/2007 | Menezes et al. ................ 704/2 |
| 7,260,568 B2* | 8/2007 | Zhang et al. ................... 707/3 |
| 7,286,978 B2* | 10/2007 | Huang et al. ................... 704/9 |
| 7,321,854 B2* | 1/2008 | Sharma et al. ............. 704/243 |
| 7,340,388 B2* | 3/2008 | Soricut et al. .................. 704/4 |
| 7,343,624 B1* | 3/2008 | Rihn et al. .................... 726/24 |
| 7,346,507 B1* | 3/2008 | Natarajan et al. ........... 704/244 |
| 7,373,291 B2* | 5/2008 | Garst ............................. 704/4 |
| 7,398,211 B2* | 7/2008 | Wang ......................... 704/257 |
| 2002/0099536 A1 | 7/2002 | Borcher et al. |
| 2004/0042667 A1 | 3/2004 | Lee et al. |
| 2004/0044952 A1 | 3/2004 | Jiang et al. |
| 2004/0143574 A1 | 7/2004 | Nakamura et al. |

OTHER PUBLICATIONS

A state-space method for language modeling Siivola, V.; Honkela, A.; Automatic Speech Recognition and Understanding, 2003. ASRU '03. 2003 IEEE Workshop on Nov. 30-Dec. 3, 2003 pp. 548-553 Digital Object Identifier 10.1109/ASRU.2003.1318499.*

Improving letter-to-sound conversion performance with automatically generated new words Jia-Li You; Yi-Ning Chen; Soong, F.K.; Jin-Lin Wang; Acoustic, Speech and Signal Processing, 2008. ICASSP 2008. IEEE International Conference on Mar. 31, 2008-Apr. 4, 2008 pp. 4653-4656 Digital Object Identifier 10.1109/ICASSP.2008.4518694.*

The use of a linguistically motivated language model in conversational speech recognition Wen Wang; Stolcke, A.; Harper, M.P.; Acoustic, Speech, and Signal Processing, 2004. Proceedings. (ICASSP '04). IEEE International Conference on vol. 1, May 17-21, 2004 pp. I-261-4 vol. 1 Digital Object Identifier 10.1109/ICASSP.2004.1325972.*

Japanese document recognition based on interpolated n-gram model of character Mori, H.; Aso, H.; Makino, S.; Docuemnt Analysis and Recognition, 1995., Proceedings of the Third International Conference on vol. 1, Aug. 14-16, 1995 pp. 274-277 vol. 1 Digital Object Identifier 10.1109/ICDAR.1995.598993.*

A multispan language modeling framework for large vocabulary speech recognition Bellegarda, J.R.; Speech and Audio Processing, IEEE Transactions on vol. 6, Issue 5, Sep. 1998 pp. 456-467 Digital Object Identifier 10.1109/89.709671.*

Chinese Keyword Extraction Based on N-Gram and Word Co-occurrence Hui Jiao; Qian Liu; Hui-bo Jia; Computational Intelligence and Security Workshops, 2007. CISW 2007. International Conference on Dec. 15-19, 2007 pp. 152-155 Digital Object Identifier 10.1109/CISW.2007.4425468.*

A multi-level text mining method to extract biological relationships Palakal, M.; Stephens, M.; Mukhopadhyay, S.; Raje, R.; Rhodes, S.; Bioinformatics Conference, 2002. Proceedings. IEEE Computer Society Aug. 14-16, 2002 pp. 97-108 Digital Object Identifier 10.1109/CSB.2002.1039333.*

Exploiting latent semantic information in statistical language modeling Bellegarda, J.R.; Proceedings of the IEEE vol. 88, Issue 8, Aug. 2000 pp. 1279-1296 Digital Object Identifier 10.1109/5.880084.*

Association pattern language modeling Jen-Tzung Chien; Audio, Speech, and Language Processing, IEEE Transactions on vol. 14, Issue 5, Sep. 2006 pp. 1719-1728 Digital Object Identifier 10.1109/TSA.2005.858551.*

Text Classification Improved through Automatically Extracted Sequences Dou Shen; Jian-Tao Sun; Qiang Yang; Hui Zhao; Zheng Chen; Data Engineering, 2006. ICDE '06. Proceedings of the 22nd International Conference on Apr. 3-7, 2006 pp. 121-121 Digital Object Identifier 10.1109/ICDE.2006.158.*

Statistical language models for on-line handwritten sentence recognition Quiniou, S.; Anquetil, E.; Carbonnel, S.; Document Analysis and Recognition, 2005. Proceedings. Eighth International Conference on Aug. 29-Sep. 1, 2005 pp. 516-520 vol. 1 Digital Object Identifier 10.1109/ICDAR.2005.220.*

U. Bandara et al., "Fast Algorithm for evaluating word sequence statistics in large text corpora by small computers", IBM Technical Disclosure Bulletin, vol. 32, No. 10B, Mar. 1990, pp. 268-270.

R. Kubota, "Lessening Index file for full text search", IBM Technical Disclosure Bulletin, vol. 38, No. 11, Nov. 1995, p. 321.

* cited by examiner a. Set n = maximum phrase size b. For i = 1 to N c. DO d. Set Counter c = 0, Entity = "".

e. WHILE c < n i. If Token[i+c] is not of interest, or is a StopWord, break ii. If (c = 0) Entity = Token[i+c]

iii. Else TmpEnity = Entity concatenated with Token[i+c]

iv. If TmpEntity is not of interest, break v. Else Entity = TmpEntity vi. Increment c f. END WHILE g. i = i + c h. END DO i. If Entity is not empty, label Entity as entity of interest.

FIG. 5

```
Context Window - k
for int i in all tokens {
    String finalToken = "";
    int j = 0;
    while (j < k) {
        String tok = getToken(i+j);
        if (isAnnotation(tok))
            if (isAnnotation(token+" " +tok)
                token = token+" " +tok;
            else
                break;
        else
            break;
    }
    i=j;
    if (finalToken != "")
        finalToken is annotation;
}
```

SYSTEM AND METHOD FOR EXTRACTING ENTITIES OF INTEREST FROM TEXT USING N-GRAM MODELS

TECHNICAL FIELD

The invention relates to a way of analyzing text to identify entities of interest within that text. More particularly, the invention relates to the ability to analyze one or more documents, in order to extract from them particular phrases or terms that may be of interest to a user.

BACKGROUND

Documents and unstructured data often contain various entities that a user would like to readily identify, such as formulae, words, phrases, or other terms. For example, a chemist might want to know all the chemical compounds referred to in a particular reference, such as an issued patent. One way of obtaining this information would be to manually read through the reference while marking or making a note of all the compounds appearing in that reference. Another way would be to have a computer analyze the text and compare that text against a library of chemical formulae and names. While such an automated approach might take less time, it is not necessarily more accurate. Furthermore, depending on how the entities of interest were tagged, the automated process might not be scalable.

What is needed is a scalable solution that allows for the rapid analysis of text in order to extract entities that are meaningful to a user, especially a solution that is retargetable to new copora. Such a solution would ideally be applicable to different kinds of entities, such as formulae and text-based words and phrases, thereby greatly improving the process of extracting structure from documents or unstructured data.

SUMMARY OF THE INVENTION

The present invention satisfies the aforementioned need by offering the user a way to rapidly analyze a document or other text and to identify entities of interest within that document or text.

One preferred implementation of the invention is a method of using at least two n-gram models, at least one of which is based on a training set of entities of interest and at least one of which is based on a training set of entities not of interest. The method includes tokenizing a document to produce a string of tokens corresponding to terms within the document. Each token is evaluated against the n-gram models to determine which model is most likely to be associated with the token. Tokens corresponding to at least one n-gram model that is of interest are identified, and the identified entities are annotated by at least one name for said at least one n-gram model. For example, the document itself may be annotated by annotating the identified entities within the document; alternatively, a file may be generated that includes annotation information associated with the identified tokens.

The method may further include annotating a group of adjacent tokens, in order to generate a maximal entity of interest that includes more than one word. In this case, the corresponding adjacent words taken together as a group form the maximal entity of interest, e.g., these words may properly be thought of as belonging together and communicating a particular idea or concept. Each token may be evaluated by calculating a relative probability that a given token has been generated by a model of interest; calculating a relative probability that the given token has been generated by a model that is not of interest; comparing the calculated relative probabilities; and associating each token with the model that yields the greater relative probability. To this end, a Markov model may be advantageously used to determine the relative probabilities, e.g., a count matrix may be used to determine the relative probabilities. In a preferred implementation, the n-gram model of interest is directed to chemical entities, and the terms within the document include terms of a chemical nature; in this case, all the terms of a chemical nature within the document may be identified. Alternatively, said at least two n-gram models may include models directed to different languages.

Another preferred implementation of the invention is a method for use with tokens corresponding to terms within a document. This method includes evaluating each token against at least 2 different Markov models to determine respective relative probabilities that it corresponds to the Markov models; for each token, comparing the relative probabilities with each other to determine which Markov model is more likely to be associated with the token; and identifying tokens most likely to correspond to a particular one of the Markov models, so that terms of interest within the document are identified. This method may further include adding tags to at least some of the terms within the document, e.g., in which tags are added to all terms corresponding to said particular one of the Markov models. That is to say, this method may include annotating the document itself in view of the identified tokens; alternatively, a file may be generated that includes annotation information associated with said identified tokens. In a preferred implementation of this method, said at least two Markov models correspond to respective n-gram models, at least one of which is based on a training set of entities of interest (such as chemical terms) and at least one of which is based on a training set of entities not of interest.

Yet another implementation of the invention includes creating respective bi-gram language models for i) entities of interest ("$M_{INT}$"), and ii) entities that are not of interest ("$M_{NOT\_INT}$"). Unstructured text of a document is then parsed into a collection C of phrases. For each phrase in C, i) the probability that the phrase is associated with the model $M_{INT}$ is calculated and ii) the probability that the phrase is associated with the model $M_{NOT\_INT}$ is calculated. Whether each phrase is an entity of interest is determined by comparing the calculated probabilities.

In other implementations of the invention, there are provided computer program products for carrying out any of the methods herein.

BRIEF DESCRIPTION OF THE DRAWINGS

FIG. 1 includes FIGS. 1A and 1B, in which:

FIG. 3 includes FIGS. 3A and 3B, in which:

FIG. 5 shows code that may be used as part of an annotation algorithm;

FIG. 6 shows code for clustering consecutive tokens found to be of the same type of text entity.

DETAILED DESCRIPTION OF THE INVENTION

Figure 1A:
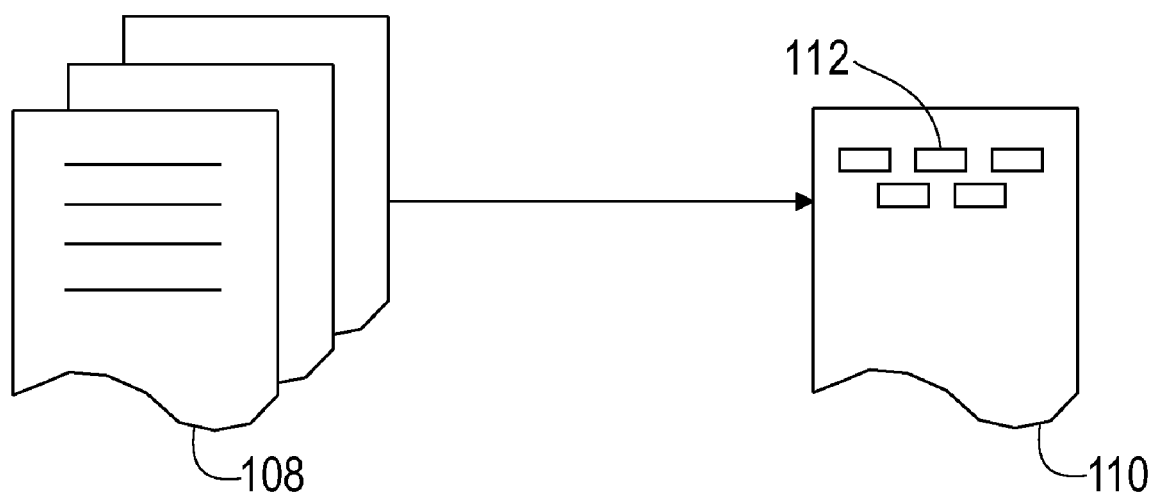
FIG. 1A shows documents being tokenized.
Figure 1B:
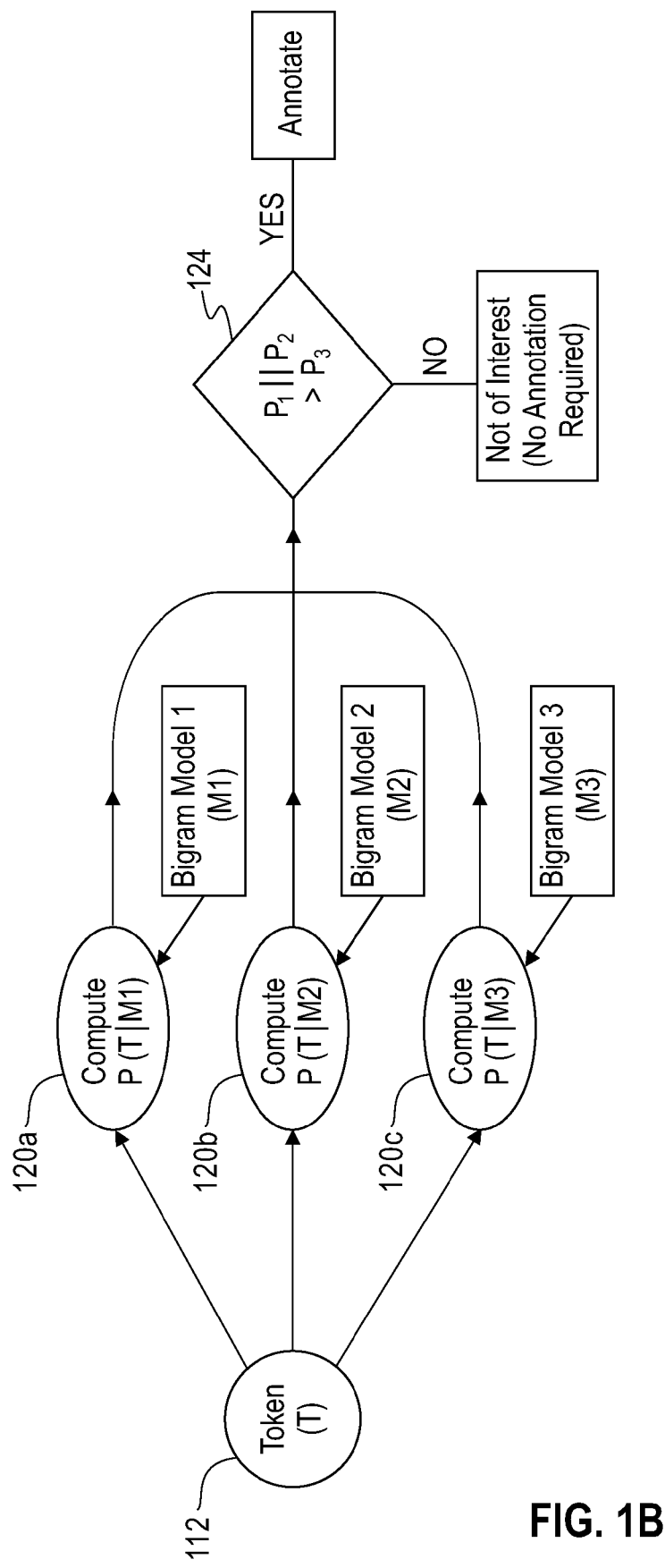
FIG. 1B shows a decision tree for determining whether to annotate a document for a given token.

Methods are disclosed herein for analyzing text to identify entities of interest within that text. FIGS. 1A and 1B show one preferred annotation technique used in implementing the invention. As shown in FIG. 1A, text, which may be in the form of one or more documents 108 (e.g., documents that are retrievable and/or storable in electronic format), is passed through a tokenizing routine to form tokenized documents 110 that include space-delimited stings or tokens 112.

As shown in FIG. 1B, these tokens 112 are then analyzed by two (or more) models M1, M2, M3, each of which has been previously trained to recognize a different type of entity, such as a chemical name (e.g., M1), a chemical formula (e.g., M2) or a plain text English language word of no particular chemistry-related interest (e.g., M3); thus, these models are used to classify the tokens. The models M1, M2, M3 of FIG. 1B are different annotation bi-gram models, which are described in greater detail below. For each token 112 in the tokenized documents 110, the models M1, M2, M3 are used in a computation step 120a, 120b, 120c, respectively, the output of which is the corresponding name of the entity type (such as "chemical" for M1 and M2, and "not a chemical" or "English" for M3) and a probability P1, P2, P3, respectively, that the token in question corresponds to the type of entity for which the given model has been trained. A comparison 124 is then made of these probabilities P1, P2, P3. That is:

$$\text{BestModel}=\operatorname{argmax}\_\{\text{model1},\ldots,\text{model N}\}\text{Prob}(\text{token}|\text{model}) \quad (1)$$

Each token may then be assigned the entity name corresponding to the model giving rise to the greatest probability, i.e., the entity name is given by the entity type of BestModel. The system may then annotate the document(s) 108 and/or 110, e.g., electronically. (In the event that the greatest probability corresponds to an entity type that is not of interest, no annotation is required.) For example, a sentence like "We then add 5 ml of $H_2SO_4$ to the mixture" could be annotated as "We then add 5 ml of <chemical> $H_2SO_4$ </chemical> to the mixture." The markup can be done in various ways, such as using markup language like XML. Alternatively, "standoff" files may be generated in which the annotation information is kept separate from the document(s) 108 and 110.

As mentioned above, each model M1, M2, M3 is designed to recognize a particular type of entity. To this end, statistical bi-gram language models have been found to work well. In general n-gram models (in which n is the number of consecutive characters analyzed and is greater than two) may be used, although the amount of training data required increases rapidly with n. The training process requires sample entities (e.g., words, terms, phrases, formulae) for each type of entity (chemical name, English language word, etc.) that a user wants to recognize. Once this training collection is in hand, it is used to build an associated bi-gram language model.

The methodologies described herein may be applied to a number of different problems. For example and with respect to FIG. 1, the bi-gram models M1 and M2 may, as an alternative, be trained to find words of two different foreign languages that appear in a document that is otherwise predominately English. In this case, the annotation procedure can be performed with a model of English and a model for each of the foreign languages.

Figure 2:
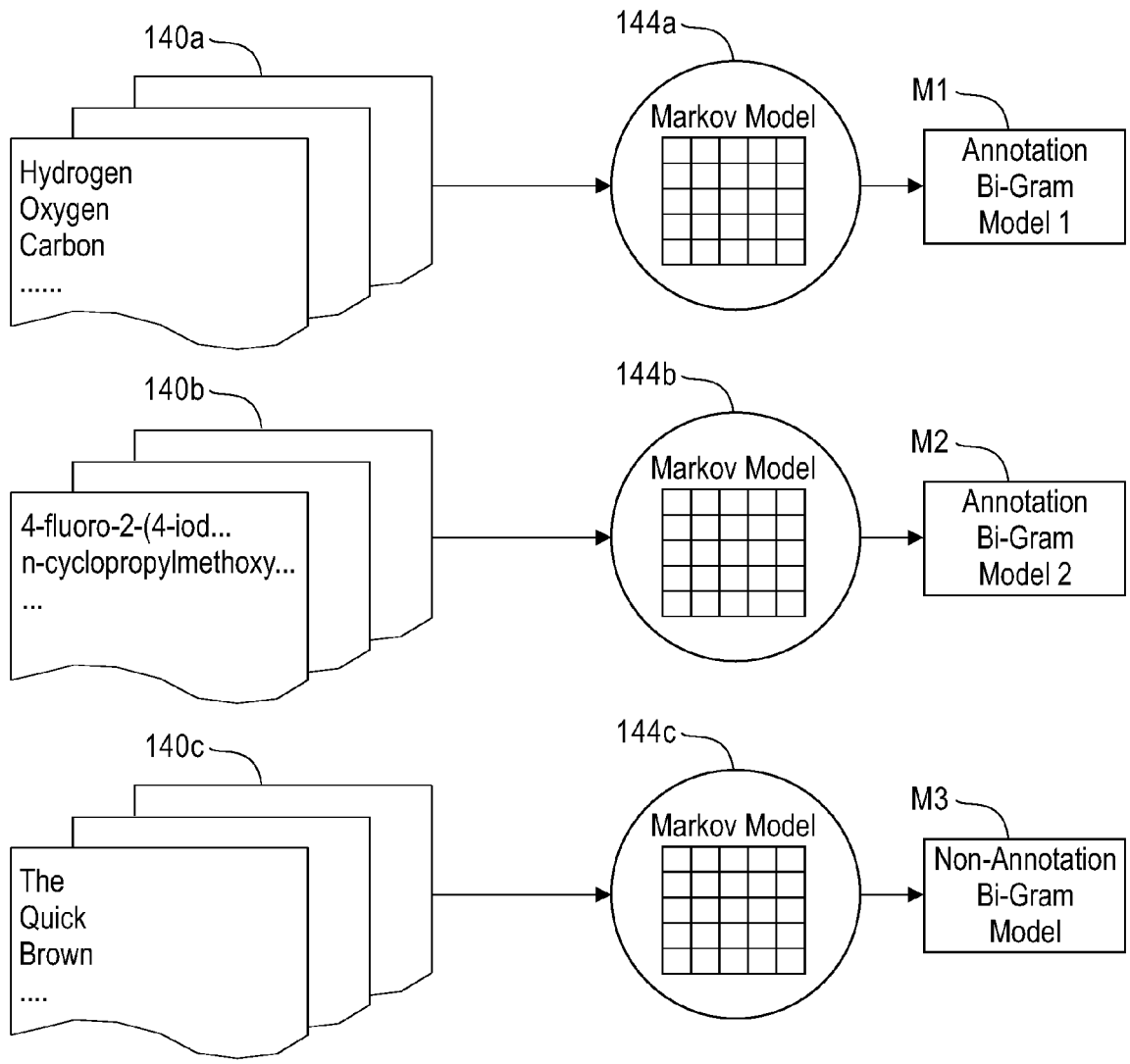
FIG. 2 shows training text being used to train the bi-gram models of FIG. 1B, in which the bi-gram models correspond to different types of text entities.

This training procedure is shown in FIG. 2 with respect to chemical terms. A collection of terms 140a consisting of chemical names (prose) is run through a Markov model 144a to form a first (annotation) bi-gram model M1. Likewise, a collection of terms 140b consisting of chemical names (formulae) is run through a Markov model 144b to form a second (annotation) bi-gram model M2. In addition, a collection of terms 140c consisting of words of the English language is run through a Markov model 144c to form a (non-annotation) bi-gram model M3. Each of the document collections 140a, 140b, 140c used as the training sets should be representative of the corpus for which the model M1, M2, M3 will be used.

If a chemical model and a model directed to non-chemical terms are used, the non-chemical model is preferably trained with text that does not include any chemically related terms, phrases, and formulae. (Text having a few chemically related terms, phrases, and formulae may be used with less favorable results.) Note that the methods described herein work better for identifying chemical terms than, for example, biological terms, since biological terms are more likely to resemble generic English than are chemical terms. Hence, it is more difficult to build models that distinguish biological terms from English terms based on the methodologies outlined herein. In general, training text can be i) manually created, ii) acquired from various existing sources like general usage or specialty dictionaries, or iii) systematically generated by parsing unstructured text, creating phrases, and then using an algorithm that tests that fragments are arranged according to some pre-specified rule characterizing the entities of interest.

Figure 3A:
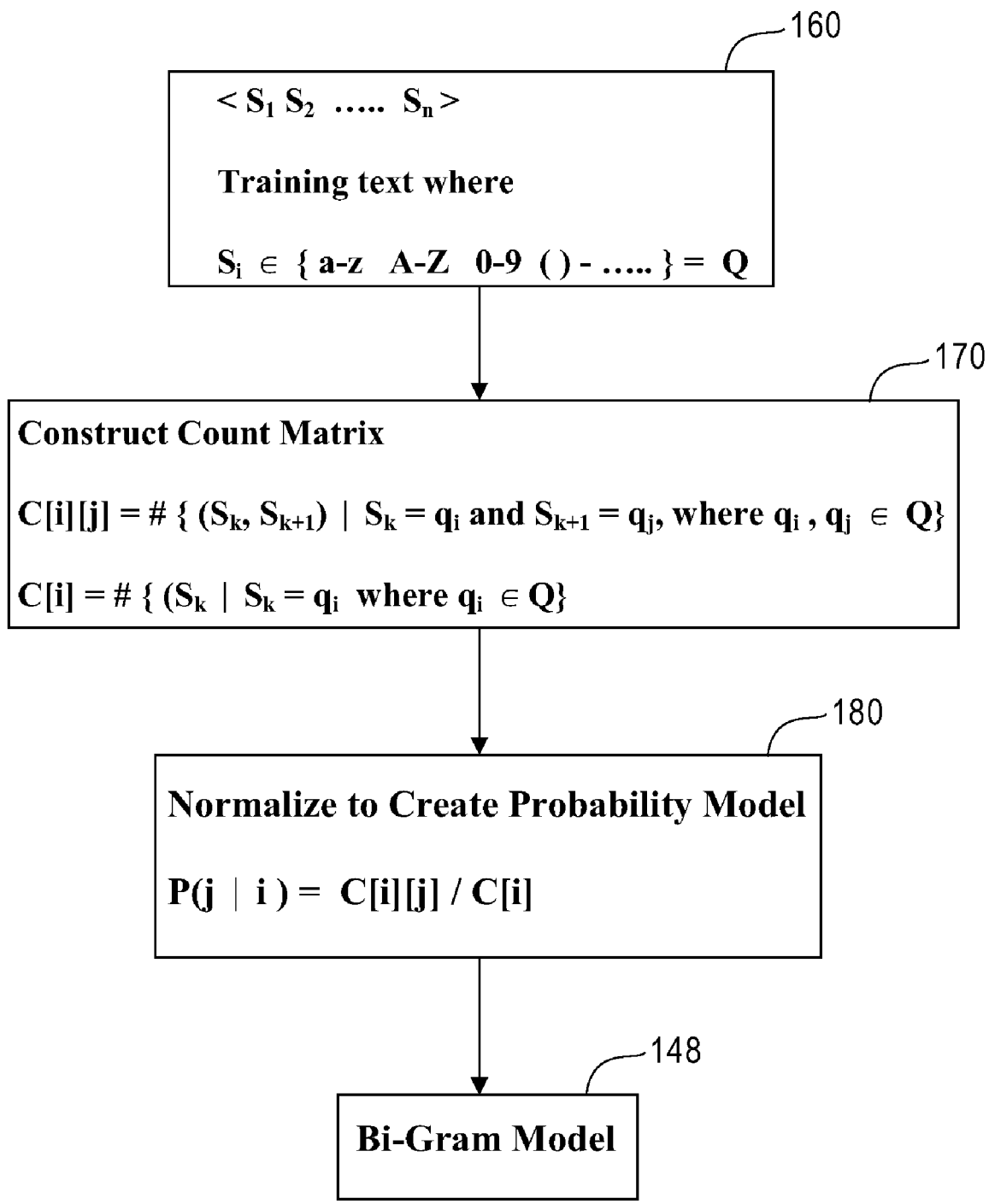
FIG. 3A shows how a bi-gram model is constructed from training text.
Figure 3B:
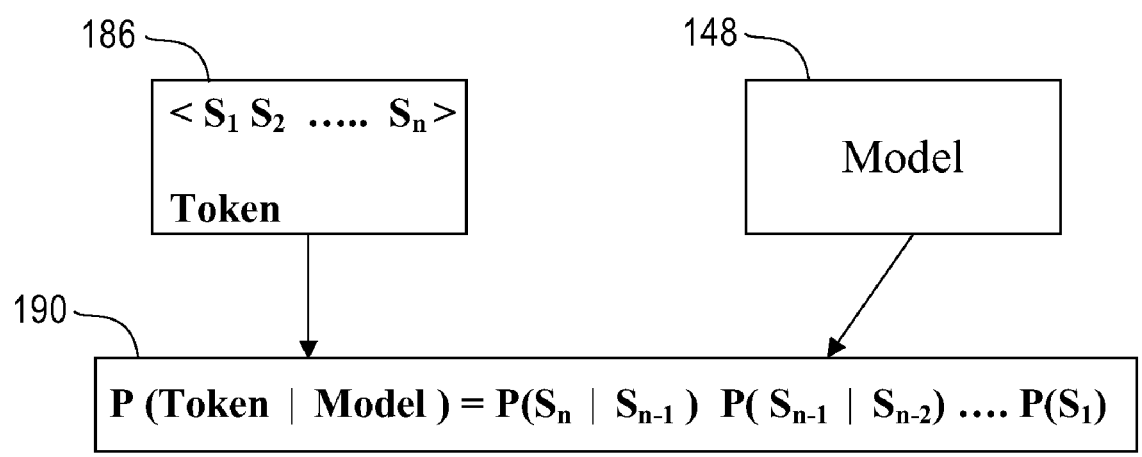
FIG. 3B shows how to calculate the probability that a given token is of a particular type of text entity.

Preferred ways of constructing a bi-gram probability model are now described in greater detail with respect to FIGS. 3A and 3B. FIG. 3A outlines a process by which a bi-gram language model is created. This process uses first order Markov assumptions (see, for example, Papoulis and Pillai, "Probability, Random Variables, and Stochastic Processes," McGraw Hill, 2001). The process begins with a collection of terms (140a, 140b, or 140c) having its own alphanumeric and/or other text-based symbols $s_j$, which may also include prefixes and suffixes (see step 160 of FIG. 3A). An assumption is made that the probability of observing a particular sequence of symbols $s_1, s_2, \ldots, s_N$, each of which is found in the corresponding collection of terms (140a, 140b, or 140c), is given by $$P(s_1,s_2,\ldots,s_N|\text{model})=P(s_N|s_{N-1})*P(s_{N-1}|s_{N-2})*\ldots *P(s_2|s_1)*P(s_1) \quad (2)$$

The individual conditional probabilities in the products $P(s_I|s_{I-1})$ can be estimated from the collection of terms (140a, 140b, or 140c) by counting the number of times that $S_I$ immediately follows $s_{I-1}$ (step 170), and then normalizing this number by the total number of times $s_{I-1}$ appears in the collection of terms in question (step 180). The result is a bi-gram model 148, such as M1, M2, and M3. Thus, the bi-gram models M1, M2, M3 are concerned with the probability of transitioning from one symbol to another. Accordingly, the models M1, M2, M3 can each be represented using a matrix in which each cell of the matrix gives the transition probability for observing the symbol $s_1$ followed by the symbol $s_2$. That is, an individual cell C[i][j] of a count matrix essentially records the number of times the symbol $S_i$ was immediately followed by the symbol $S_j$ in the training corpus (see step 170). If one then divides this quantity by the number of times C[i] that the symbol $S_i$ occurred in the corpus (see step 180), one gets an estimate of the conditional probability: P(j|i)=C[i][j]/C[i].

FIG. 3B shows how once these probabilities are estimated for a particular type of entity in accordance with a certain model 148, one can compute the probability that a given token 186 is the same type of entity by multiplying together all the terms in equation (2), shown as step 190. Note that while the true probabilities and conditional probabilities are not known, these can be estimated from the documents 108 and/or 110 by counting the number of relative number of occurrences of the specific pattern in which one is interested, compared to all the unique patterns that occurred in the documents.

Figure 4:
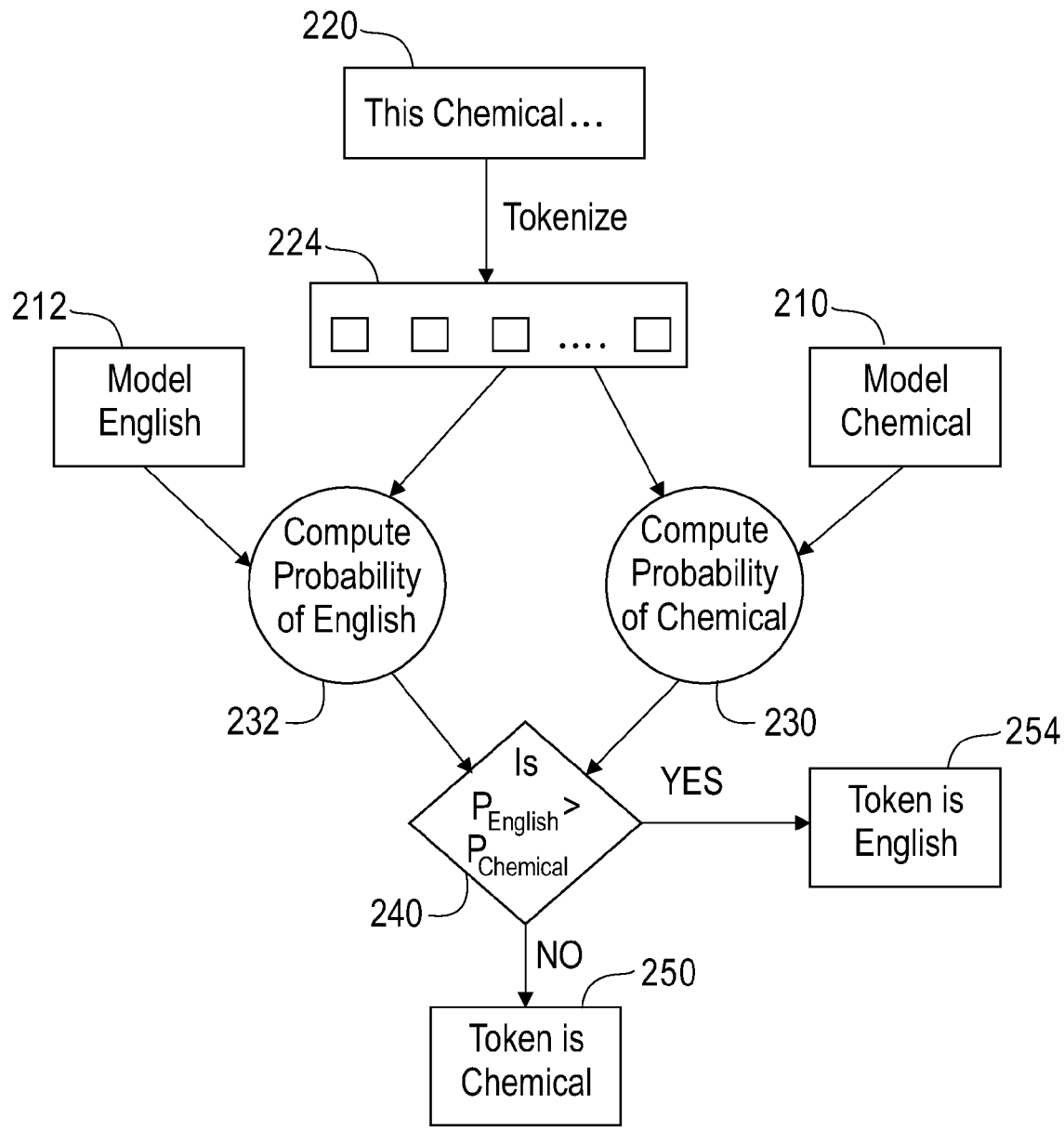
FIG. 4 shows a tokenization process and a decision tree for determining whether to annotate an entity in a document.

With respect to FIG. 4, consider once again the problem of finding chemical entities in a document. The document could be, for example, a U.S. patent that discloses certain chemical drugs. In this case, the user will want to find text corresponding to chemical entities. In this example, one employs two models 210 and 212, which are directed to chemical names/formulae and general usage, plain text (non-chemical) English words, respectively. The English language model 212 is preferably trained with text having no or few chemical names (e.g., such as general interest articles from a newspaper). The chemical model 210 can be trained on a database of chemical names.

Given a text string 220 from which is constructed a set 224 of tokens, the chemical model 210 and the English language model 212 are then used to compute the probabilities that each token is a chemical name or a general usage English word (steps 230, 232, respectively). These probabilities are compared (step 240): If the chemical model 210 assigns a greater probability to the token than the English language model 212, the token is denoted and annotated as being chemical (step 250); otherwise, the token is denoted as being English or not-a-chemical (step 254). This process is then repeated for all tokens in the document(s) of interest. The document(s) may then be annotated to indicate which terms, phrases, formulae, etc. are chemical in nature. FIG. 5 shows code that may be used as part of an annotation algorithm.

FIG. 6 shows code that may be used as part of a grouping step. That is to say, if consecutive tokens are found to be of the same type of entity, they may be advantageously clustered together and the maximal token sequence is assigned the associated entity type. While individual tokens can be chemical entities, multiple consecutive entities may at times form a specific chemical token. That is, the contiguous set of tokens taken together can be viewed symbolically as forming one chemical entity. The code shown in FIG. 6 essentially collects neighboring tokens that have been identified as belonging to one entity type, and then groups and labels them as one token.

Computing System

Figure 7:
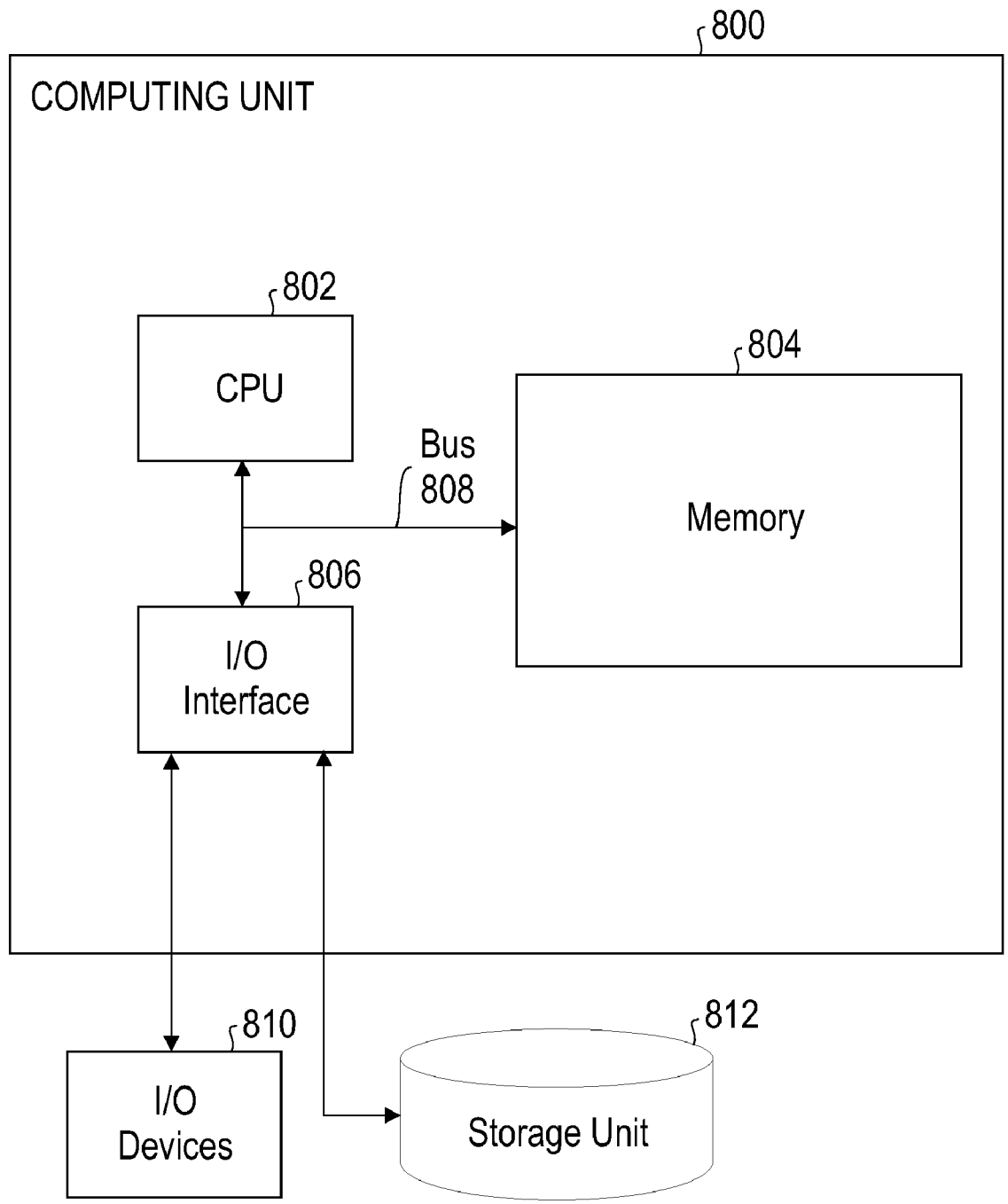
FIG. 7 is a block diagram of a computing unit that may be used in implementing the methods disclosed herein.

FIG. 7 is a block diagram of a computing unit 800 for implementing embodiments of the invention. Computing unit 800 is suitable for storing and/or executing program code directed to implementing the methods disclosed herein, and generally comprises a central processing unit (CPU) 802, a memory 804, an input/output (I/O) interface 806, a bus 808, I/O devices 810 and a storage unit 812. CPU 802 performs computation and control functions of computing unit 800. CPU 802 may comprise a single processing unit, or be distributed across one or more processing units in one or more locations (e.g., on a client and server).

Local memory elements of memory 804 are employed during actual execution of the program code used to implement the methods disclosed herein. Cache memory elements of memory 804 provide temporary storage of at least some program code in order to reduce the number of times code must be retrieved from bulk storage during execution. Further, memory 804 may include other systems not shown in FIG. 7, such as an operating system (e.g., Linux) that runs on CPU 802 and provides control of various components within and/or connected to computing unit 800.

Memory 804 may comprise any known type of data storage and/or transmission media, including bulk storage, magnetic media, optical media, random access memory (RAM), read-only memory (ROM), a data cache, a data object, etc. Storage unit 812 is, for example, a magnetic disk drive or an optical disk drive that stores data. Moreover, like CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, hand-held device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computing unit 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk—read-only memory (CD-ROM), compact disk—read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

What is claimed is:

1. A method of using at least two n-gram models, at least one of which is based on a training set of entities of interest and at least one of which is based on a training set of entities not of interest, the method comprising:
   tokenizing a document to produce a string of tokens corresponding to terms within the document;
   for each token, evaluating the token against the n-gram models to determine which model is most likely to be associated with the token;
   identifying tokens corresponding to at least one n-gram model of interest; and
   annotating the identified tokens with at least one name for said at least one n-gram model of interest.

2. The method of claim 1, comprising annotating a group of adjacent tokens, in order to generate a maximal entity of interest that includes more than one word.

3. The method of claim 1, wherein said at least one n-gram model of interest is directed to chemical entities.

4. The method of claim 1, wherein said evaluating comprises:
   calculating a relative probability that a given token has been generated by a model of interest;
   calculating a relative probability that the given token has been generated by a model that is not of interest;
   comparing the calculated relative probabilities; and
   associating each token with the model that yields the greater relative probability.

5. The method of claim 4, wherein a Markov model is used to determine the relative probabilities.

6. The method of claim 4, wherein a count matrix is used to determine the relative probabilities.

7. The method of claim 1, wherein said at least two n-gram models include models directed to different languages.

8. The method of claim 1, wherein the terms within the document include terms of a chemical nature.

9. The method of claim 8, wherein all the terms of a chemical nature within the document are identified.

10. The method of claim 1, wherein the method is implemented by at least one computer.

11. A method for use with tokens corresponding to terms within a document, comprising:
    evaluating each token against at least 2 different Markov models to determine respective relative probabilities that the token corresponds to the Markov models;
    for each token, comparing the relative probabilities with each other to determine which Markov model is more likely to be associated with the token; and
    identifying tokens most likely to correspond to a particular one of the Markov models, so that terms of interest within the document are identified.

12. The method of claim 11, further comprising generating the tokens corresponding to the terms within the document.

13. The method of claim 11, further comprising adding tags to at least some of the terms within the document.

14. The method of claim 13, wherein tags are added to all terms corresponding to said particular one of the Markov models.

15. The method of claim 11, wherein said at least two Markov models correspond to respective n-gram models, at least one of which is based on a training set of entities of interest and at least one of which is based on a training set of entities not of interest.

16. The method of claim 15, wherein the training set of interest is directed to chemical terms.

17. The method of claim 11, comprising:
    evaluating each token against at least 3 different Markov models to determine respective relative probabilities that the token corresponds to the Markov models, at least 2 of the Markov models being directed to terms that are of interest, and at least one of the Markov models being directed to terms that are not of interest; and
    identifying tokens associated with said at least 2 of the Markov models directed to terms of interest.

18. The method of claim 17, further comprising annotating the document in view of the identified tokens.

19. The method of claim 11, further comprising generating a file that includes annotation information associated with said identified tokens.

20. The method of claim 11, wherein the method is implemented by at least one computer.

21. A method, comprising:
    creating respective bi-gram language models for i) entities of interest ("$M_{INT}$"), and ii) entities that are not of interest ("$M_{NOT\_INT}$");
    parsing unstructured text of a document into a collection C of phrases;
    for each phrase in C, calculating i) the probability that the phrase is associated with the model $M_{INT}$ and ii) the probability that the phrase is associated with the model $M_{NOT\_INT}$; and
    determining whether each phrase is an entity of interest by comparing the calculated probabilities.

22. The method of claim 21, further comprising annotating entities of interest in the document.

23. The method of claim 21, wherein the method is implemented by at least one computer.

24. A computer program product comprising a computer useable medium that includes computer usable program code tangibly embodied thereon for use with tokens corresponding to terms within a document, the product including:
    code for evaluating each token against at least 2 different Markov models to determine respective relative probabilities that the token corresponds to the Markov models;
    code that, for each token, compares the relative probabilities with each other to determine which Markov model is more likely to be associated with the token; and
    code for identifying tokens most likely to correspond to a particular one of the Markov models, so that terms of interest within the document are identified.

25. The computer program product of claim 24, wherein said at least two Markov models correspond to respective n-gram models, at least one of which is based on a training set of entities of interest and at least one of which is based on a training set of entities not of interest.

26. The computer program product of claim 25, wherein the training set of interest is directed to chemical terms.

27. The computer program product of claim 26, further comprising code for annotating the document in view of the identified tokens.

* * * * *